Dec. 26, 1922.
N. J. NIELSEN.
MILK CAN FOR TRANSPORT.
FILED MAR. 26, 1920.
1,439,834
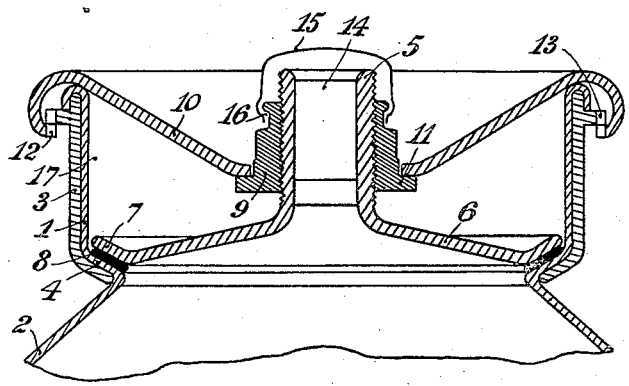
Inventor
N. J. Nielsen
By H. R. Kerslake
Atty Patented Dec. 26, 1922.

1,439,834

UNITED STATES PATENT OFFICE.

NIELS JONAS NIELSEN, OF AARHUS, DENMARK.

MILK CAN FOR TRANSPORT.

Application filed March 26, 1920. Serial No. 369,007.

*To all whom it may concern:*

Be it known that I, NIELS JONAS NIELSEN, manufacturer, subject of the King of Denmark, residing at Aarhus, Denmark, have invented certain new and useful Improvements in Milk Cans for Transport, of which the following is a specification.

The object of this invention is a device in connection with milk cans, and it consists in means for transforming the ordinary wide neck of such cans into a neck with a narrow passage capable of being tightly closed by a cork, and whereby the milk-can may be used in a satisfactory way from a hygienic point of view for transporting and keeping the milk through longer distances and for a longer period than under ordinary circumstances, quite especially for export of sterilized or homogenized milk.

A form of construction of the invention is schematically shown on the accompanying drawing in which the figure is a fragmentary view through the neck of the improved can.

The ordinary wide neck 1 on the can 2, which may for instance be made of aluminium, has a strengthening ring 3 and a suitable tightening surface 4. The upper edge of the neck 1 can be burred up as shown, around the upper edge of the strengthening ring. In the wide neck is arranged a narrow neck 5 having a collar 6 provided with a tightening surface 7 corresponding to the aforesaid tightening surface 4. The outer surface of the neck is screw-threaded for receiving a nut 9 which can act upon a tightening member 10 capable of being kept axially firm in relation to the neck 1, so that in moving the nut 9 upwards on the neck, the collar 6 and member 10 are separated thereby causing the neck 5 to keep firmly and tightly on the can. The aforesaid tightening member may for instance be a disc butting with its middle against a collar 11 on the nut 9, said disc having a downwardly bent edge with a number of inwardly turned projections 12, which may be pushed in between corresponding outwardly turned projections 13 on the ring 3, and be brought down underneath these by turning. The neck 5 is closed by means of a cork 14, and above this one may be arranged a cap 15, for instance of aluminium, whose edge is pressed into a groove 16 in the nut 9.

When the can has to be cleaned or when it has to be transformed into an ordinary transport can with its ordinary lid, the nut 9 is loosened and the disc 10 turned so as to get its projections 12 free of the projections 13. The narrow neck 5, 6 with the tightening members 9, 10 and the tightening ring 8 may then be removed. Instead of letting the central neck 5 itself form the screw for the nut 9, the collar 6 may be provided with two, or more eccentrically disposed screw-pins each with a nut and actuating the tightening member 10. Or, the narrow neck may be eccentrically disposed, or two or more eccentrically disposed necks may be provided (for instance one for filling on the milk and another for the outlet and admission of the air) and the nut 9 screwed on to a central solid pin. The tightening member needs not be a disc, whereby a closed air-space 17 is formed in the neck 1, but it may have the form of a bar or be star-shaped, and its connection with the neck 1, 3 may be established by any suitable means, for instance by allowing the tightening member to project into holes in the cylindrical part of the neck.

The details as shown in the drawing have no bearing on the nature of the invention, and they may be varied in many ways.

I claim:

1. A supplemental neck for application to the neck of a can, a member provided with a discharge opening and adapted for insertion in the neck of a can, a band-like member adapted for external application to the neck of a can, and means coacting with the first and second mentioned members for moving one member relative to the other whereby to clamp the first mentioned member in position in the can neck.

2. In a supplemental neck for application to the neck of a can, a member provided with a discharge port adapted for insertion in the neck of a can, means for establishing a fluid tight joint between the ported member and the neck of a can, a band-like element adapted for external application to the neck of the can, and means coacting with the ported member and the band-like element adapted to clamp the ported member in position in the neck of a can and operating to compress the fluid-tight joint.

3. A supplemental neck for cans comprising a member provided with a discharge port adapted for insertion in the neck of a can, a member mounted for adjustment on the ported member, and means attached to the neck of a can externally thereof coacting with the adjustable member to clamp the ported member in position in the can neck.

4. A supplemental neck for cans comprising a member provided with a tubular extension constituting a discharge port, said member being adapted for insertion in the neck of a can, a member adjustably fitted on the tubular extension, means partially adapted for external application to the neck of a can and coacting with the adjustable member to clamp the first mentioned member in position, and a sealing element removably applied to the tubular extension.

5. In milk cans and like vessels, the arrangement according to which the wide neck of the vessel is provided with projections and a seat, a tightening member engageable with said projections, a supplemental neck member engageable with said seat provided with a narrow neck, a screw connection disposed between the supplemental neck member and the tightening member for pressing such parts away from each other, so that the supplemental neck member may be pressed on to its seating and the vessel thus transformed into one having an ordinary narrow neck closure, substantially as described.

6. In milk cans and like vessels, as claimed in claim 5, the arrangement according to which the screw-connection comprises a nut threaded on the narrow neck and operative to press the tightening member and disc or flange device away from each other, substantially as described.

7. Closure device for milk cans and like vessels comprising a disc formed with a tubular neck and with peripheral jointing means, tightening means adapted to be fixed to the mouth of the vessel, and a screw adjustment operating between the tightening means and the disc device all substantially as hereinbefore described with reference to the accompanying drawing.

8. In a supplemental neck for cans, a member provided with a discharge port and adapted for insertion in the neck of a can, a member adapted for external application to said neck, means for establishing a fluid tight joint between the supplemental neck and the can neck, and means coacting with said ported member and the externally applied member to move one member relative to the other member and thereby clamp and tighten the ported member in the can neck.

In testimony whereof I have affixed my signature in the presence of two witnesses.

NIELS JONAS NIELSEN.

Witnesses:
 ERNEST BOUTARD,
 H. BRUNN.